July 24, 1962
J. MORRIS
3,046,382
SPIRAL TUBE MILL
Filed May 5, 1959
4 Sheets-Sheet 1
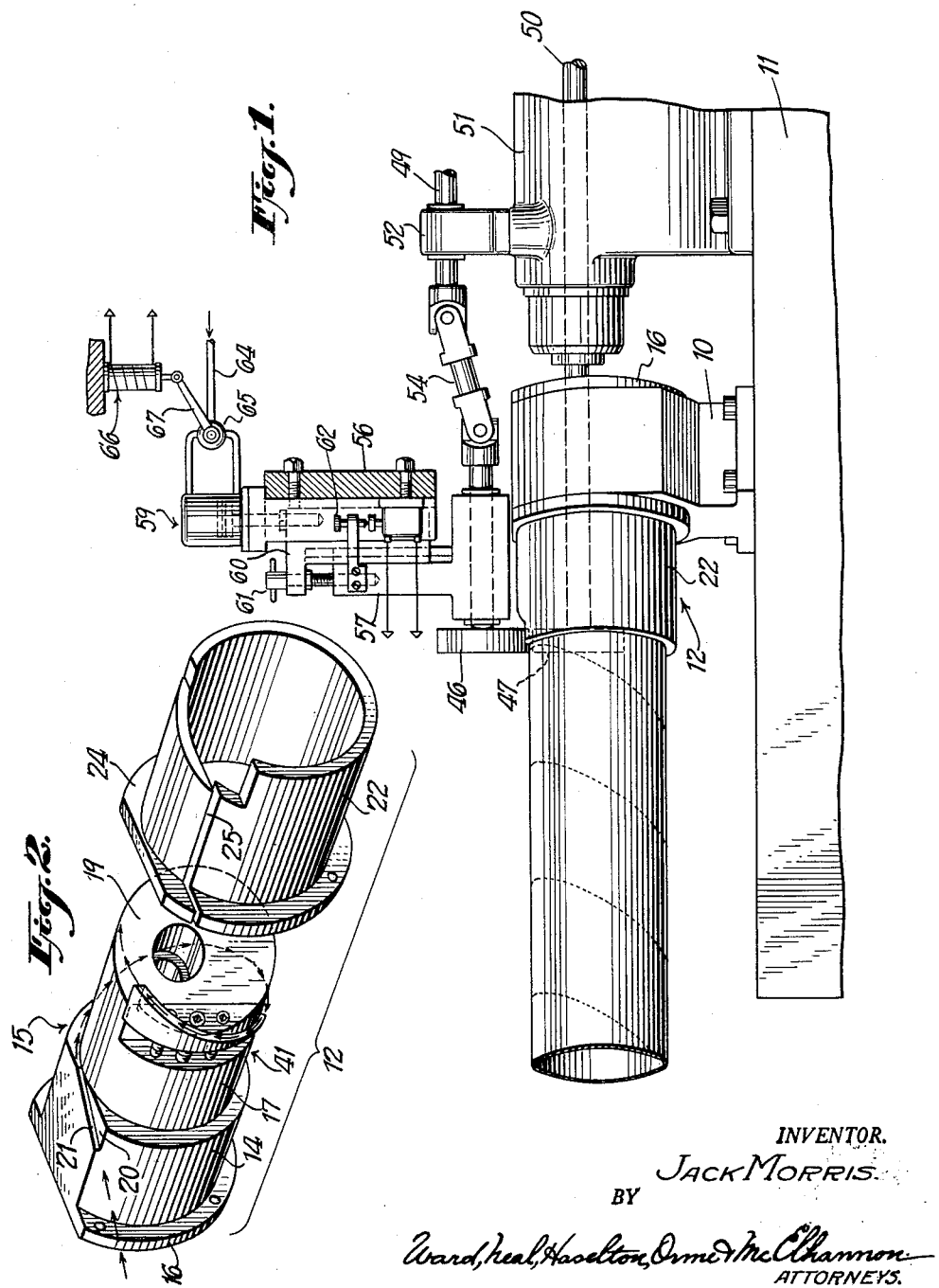
INVENTOR.
JACK MORRIS
BY
Ward, Neal, Haselton, Orme & McClannon
ATTORNEYS.

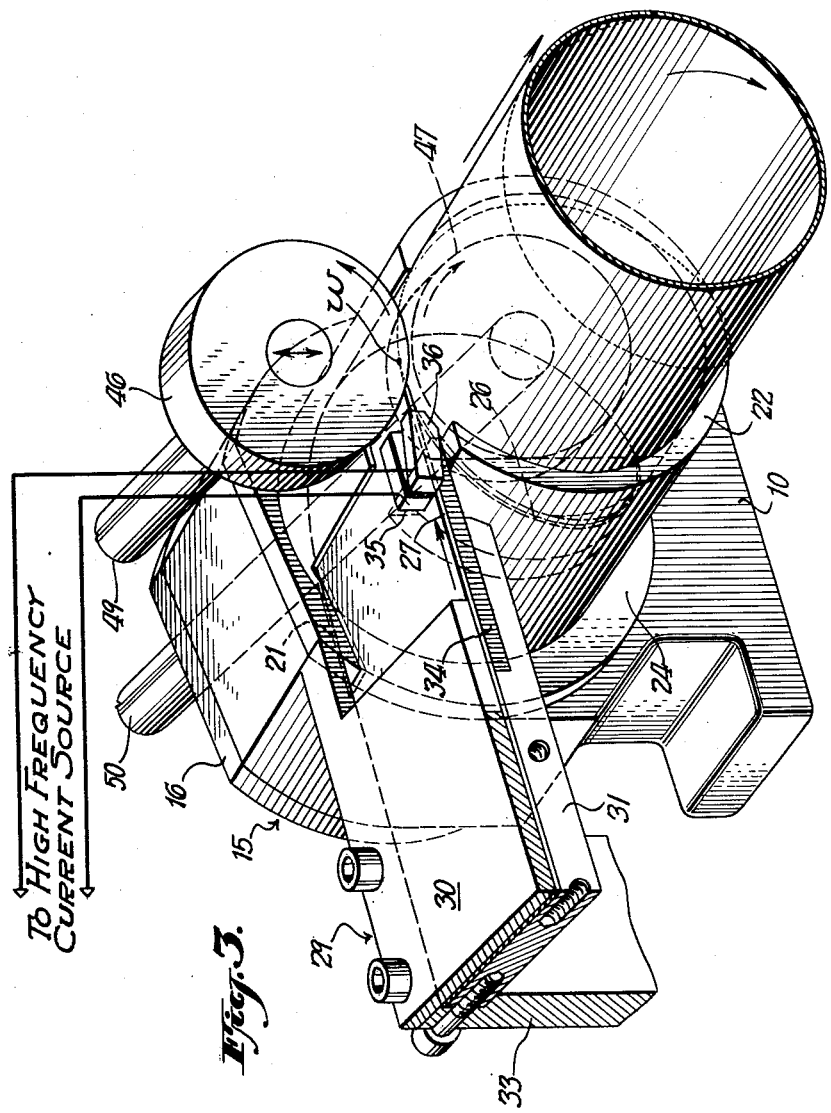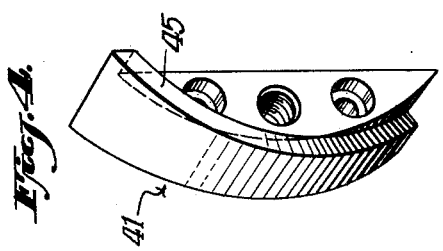

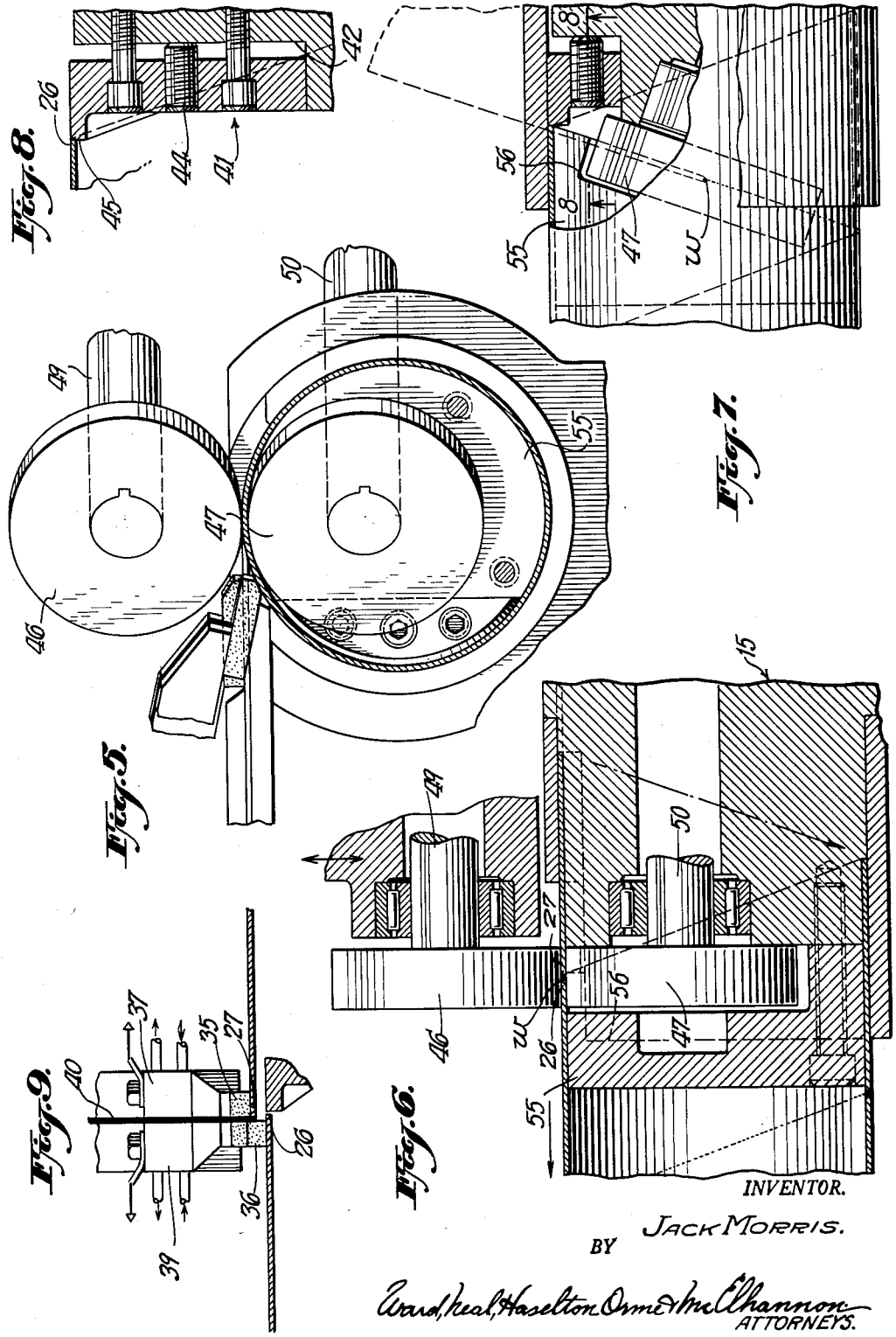

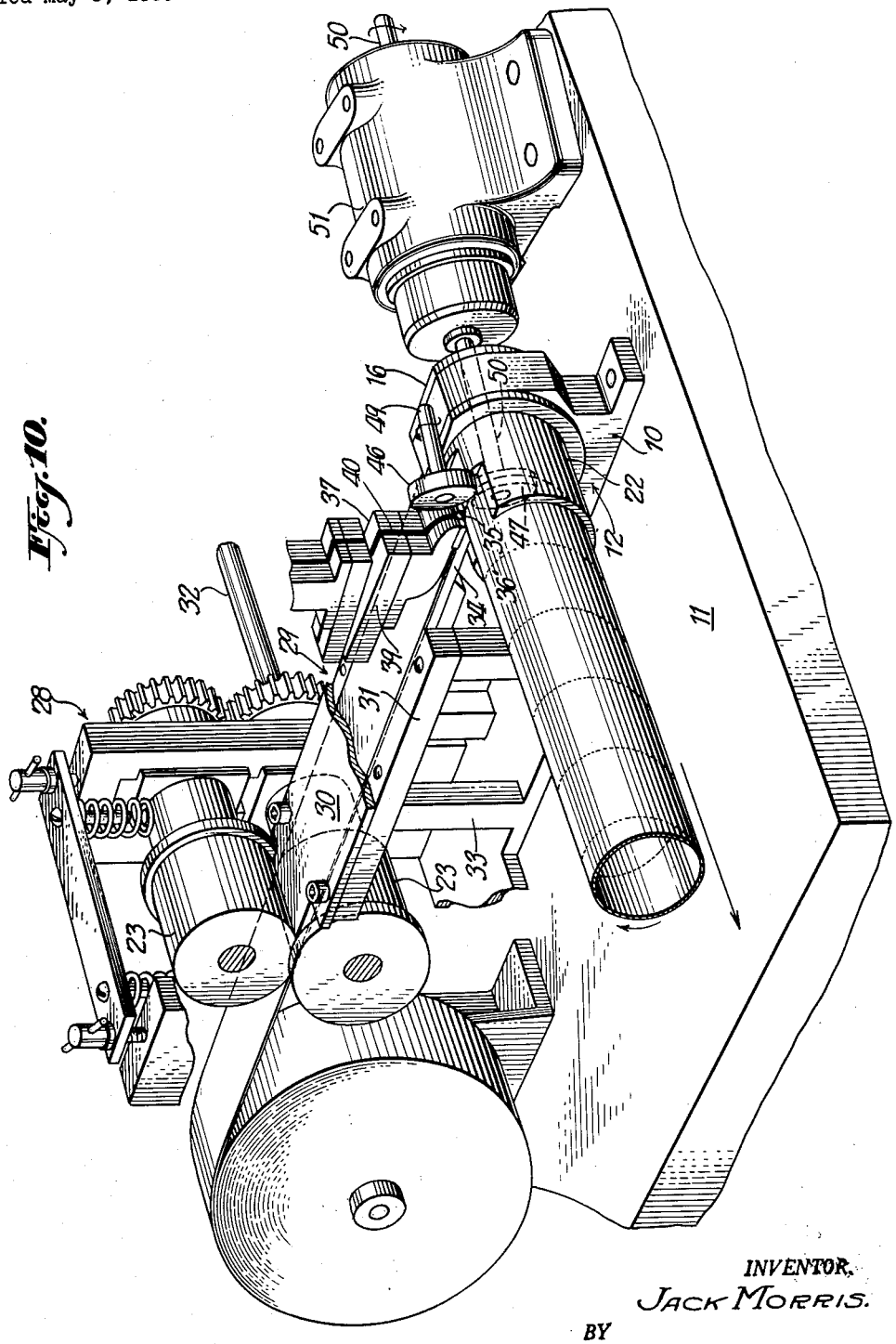

United States Patent Office 3,046,382
Patented July 24, 1962

3,046,382
SPIRAL TUBE MILL
Jack Morris, Monsey, N.Y., assignor, by mesne assignments, to American Machine & Foundry Company, New York, N.Y., a corporation of New Jersey
Filed May 5, 1959, Ser. No. 811,214
6 Claims. (Cl. 219—62)

This invention relates to the formation and welding of tubing and, more particularly, to improved means for helically winding a metal strip or ribbon while welding together adjacent edges of the ribbon along a helical line. The present invention may, for example, be utilized with high frequency resistance welding in accordance with the method disclosed in U.S. Patent No. 2,873,353 to Wallace C. Rudd entitled "Welding of Helically Formed Tubing."

It is known in the art to form tubing by winding a metal ribbon and welding the same along a helical line, and various apparatus for performing such an operation are also known. While some of these apparatus have met with certain degrees of commercial success, nevertheless, in attempting to produce spiral tubing on an industrial scale, certain difficult problems have arisen. For example, in some cases, the stock is wound around a rotating mandrel which is therefore subject to considerable wear and requires frequent replacing. Additionally, the speed of travel of the strip or ribbon of metal to the mandrel and of the finished tube away from the mandrel is slow, and constant care has to be taken to assure a proper weld. Heretofore such welds have frequently been irregular and unsightly. Furthermore, in the event of a power failure in the welding circuit, cold metal may travel through the mill thus damaging the mill. Accordingly, the present invention has for its particular purpose the contribution of a spiral tube mill that makes possible the continuous, rapid formation of uniform spiral lap or mashed lap welded tubing, the mill comprising a forming head which can handle an indefinite length of tubing and which has a relatively long life.

A particular feature of the present invention resides in the arrangement of the forming head for receiving a ribbon or strip of metal and helically winding the same into a tube, the forming head comprising stationary mandrel means axially disposed at the helix angle of the tube relatively to the line of advance of the strip, and means for guiding the strip around the mandrel means. Welding means are, of course, provided for heating an edge of the advancing strip and a trailing edge of the tube in advance of the point of contact of these edges for forming a weld along a line of juncture thereof. The tube take-off end of the stationary mandrel means is preferably truncated at the helix angle of the tube and pressing means are provided which may include a roller supported adjacent the truncated face of the mandrel means and rotatable about an axis inclined at the complement of the helix angle relatively to the axis of the mandrel means, the pressing means acting on the edges of the strip and tube as they are brought into contact at welding temperature.

As a further feature of the present invention, the means for guiding the strip around the mandrel means may comprise a second stationary member substantially surrounding the mandrel means and being slightly spaced therefrom thereby to cooperate with the mandrel means to helically guide the advancing strip into tubular formation. The guide means is formed with strip-receiving means preferably in the form of a slit therein permitting the strip to enter the space between the guide means and the mandrel means.

An additional feature of the present concept involves the utilization of a cam member adjustably positioned relatively to the mandrel means for guiding the trailing edge of the tube as it is spirally wound about the mandrel means thereby to control the relative positions of the trailing edge of the tube and the leading edge of the advancing strip, and thus the degree of lap at the weld point. Additional guide means are provided in the stationary mandrel for guiding an edge of the strip as it is fed into the forming head, and a plug member may be disposed relatively to the forming head for guiding the tube away from the forming head as it is formed.

A further important aspect of the present invention involves the provision of opposed squeeze rollers positioned to act on the respective trailing and leading edges as they are brought into contact at the weld point, these rollers having transverse elements on the peripheries thereof which, at the weld point, are disposed in horizontal planes parallel to the longitudinal axis of the mandrel means whereby the transverse elements at the weld point are substantially parallel to each other. In connection with this aspect of the invention, provision is made for automatically relieving the roller pressure that squeezes the metal edges together at the weld point immediately upon failure of the welding power, thus enabling the metal stock to pass freely between the rollers. For example, this safety feature of the invention may involve the utilization of a slide upon which one of the rollers is mounted. This slide is provided with preloaded springs as to absorb the shock of the cold stock traveling through the squeeze rollers if the power is suddenly shut off. Or, the rollers may be urged together by hydraulic pressure which is relieved upon the occurrence of a power failure.

There has been thus outlined rather broadly the most important features of the present invention in order that a detailed description thereof that follows may be better understood and in order that the present contribution to the art may be better appreciated. There are, of course, additional features of the invention that will be described hereafter and which will form the subject of claims appended hereto. Those skilled in the art will appreciate that the conception on which the present disclosure is based may readily be utilized as the basis for designing other structures for carrying out the several purposes of this invention. It is important, therefore, that the claims be regarded as including such equivalent constructions as do not depart from the concept and scope of this invention.

A specific embodiment of the invention has been chosen for purposes of illustration and description and is shown in the accompanying drawings forming a part of the specification, wherein:

FIG. 1 is a fragmentary elevational view, partly in cross-section, of a spiral tube mill in accordance with the present invention;

FIG. 2 is an exploded perspective view of elements of the forming head;

FIG. 3 is a perspective view of the mill illustrated in FIG. 1;

FIG. 4 is a perspective view of the adjustable cam member;

FIG. 5 is a fragmentary end elevational view of the mill of FIGS. 1 and 2;

FIG. 6 is a fragmentary plan view, partly in cross-section, illustrating a portion of the mill of the present invention;

FIG. 7 is a fragmentary plan view, partly in cross-section, illustrating the advancing strip entering the mill in lapped position relatively to the trailing edge of the tube as controlled by the cam member;

FIG. 8 is a sectional view taken along lines 8—8 of FIG. 7;

FIG. 9 is a fragmentary end view, partly in cross-section, illustrating the respective positions of the edges to be welded under the control of the cam member and in contact with the electrodes; and FIG. 10 is a perspective view of part of the mill illustrating the strip feed mechanism.

Referring now to the drawings, and more particularly to FIGS. 1 to 3 thereof, there is shown a mill in accordance with the present concept supported by a mounting block 10 which is in turn fastened to a bed 11. The block actually supports the forming head 12 and for this purpose has a hole therethrough into which is fitted a drum-like portion 14 of the mandrel 15. This mandrel also has a flange 16 at one end of the drum-like portion thereof, which flange may be bolted to one end of the mounting block. Extending beyond the block at its end opposite the flange 16, the mandrel has a body portion 17 of reduced diameter relatively to the diameter of the drum-like portion, and this body portion is truncated at its free end to provide an oval face 19 in a plane parallel to the line of advance of the strip. The edge of the drum-like portion of the mandrel adjacent its body portion is formed with a notch 20 providing an angular face 21 for a purpose that will subsequently appear.

As has been stated, the forming means also includes guide means here shown as a cage 22. The cage is of generally tubular configuration and substantially surrounds the body portion 17 of the mandrel 15 and is also formed with a flange 24 that is bolted to the mounting block to support the cage in spaced relation to the body portion of the mandrel so that the strip or ribbon of metal to be welded may pass freely therebetween. To admit the strip to the space between the mandrel body portion and the cage, the cage is formed with a slot 25 therein located adjacent the notch 20 in the drum-like portion of the mandrel. It is important to note that the present novel construction provides a forming head comprising a mandrel and a cage that are at all times stationary.

From the description thus far, it will be seen that as the strip is advanced towards the forming means at the helix angle of the tube relatively thereto, and enters the space between the mandrel body portion and the cage through the slot 25, it is wound in a helical path, one edge of the advancing strip being guided by the angular face 21 provided by the notch 20. As the strip completes a revolution, it defines a tube having helical edges, the trailing edge 26 of which approaches the leading edge 27 of the advancing strip. The strip may be fed to the mill by suitable pairs of pinch rollers 23 shown in FIG. 10, advantageously provided with spring means 28 which allow the strip to slip if the rate of feed is too fast; and an enclosed strip guide 29 that comprises spaced upper and lower plates 30 and 31, respectively, between which the strip passes. The feed rollers 23 receive driving power from a shaft 32 that is suitably connected to a power source (not shown). The strip guide 29 is supported on a pair of opposed uprights 33, only one of which is shown, and the foremost region of the lower plate 31 is recessed to receive a non-metallic insulating extension member 34 that supports the strip as close as possible to the weld region $w$. The pinch rollers and strip guide are so disposed as to freely advance and guide the strip towards the mill, in accordance with the natural tendency of the strip to unroll, and no side pressure of any kind is exerted against the moving strip. The axes of the pinch rollers are parallel to the shaft of the strip take-off reel (not shown) and the strip guide is substantially level and extends lengthwise at right angles to the shaft of the take-off reel.

As the leading edge of the advancing strip and the trailing edge 26 of the tube approach the weld region $w$, they are brought to welding temperature, preferably by the application thereto of high frequency electrical current. For this purpose, contacts or electrodes 35 and 36 slidably engage the respective approaching edges 27 and 26, as best shown in FIGS. 3, 5 and 9. The electrodes 35 and 36, for example, may be mounted on and suitably secured to metal holders 37 and 39, respectively, which are insulated with respect to each other by a suitable insulation piece 40 located therebetween. As more fully explained in U.S. Patent No. 2,873,353 referred to hereinbefore, the electrode holders as shown are advantageously connected to the terminals of oscillatory current of high frequency, preferably radio frequency in the range of 100 to 500 kilocycles per second. With current of such frequencies, the path of lowest possible impedance connecting the electrodes will be along the approaching edges 26 and 27, that is, from the electrodes to and from the weld region.

It is preferred that the trailing edge 26 of the last convolution of the tube and the leading edge 27 of the advancing strip come together in lapped relation at the weld region. Therefore, to control this relationship, there is provided a cam member 41, best shown in FIGS. 4 and 8. This member 41 may advantageously be bolted to the mandrel, which is recessed as at 42 for that purpose, and may be adjustably positioned relatively to the mandrel either from the outside, or from the inside, e.g., by an adjusting screw 44. The cam has a curved outer surface 45, the edge of which is angular to the line of advance of the strip by the helix angle of the tube so that the surface 45 slidably engages the trailing edge 26 of the last tube convolution thus to resist its natural tendency to retract towards the advancing strip to unwind in a flat spiral.

Preferably, at or just following the weld region 2, the overlapping edges are pressed firmly together by opposed pressure rollers 46 and 47. As has already been mentioned, the mandrel body portion, about which the strip is wound, is truncated at its end opposite the drum-like portion, in a plane parallel to the line of advance of the strip to provide an oval, angular face 19. The pressure rollers 46 and 47 are mounted for rotation in a plane parallel to that of the oval face 19 of the mandrel. The outer or upper pressure roller 46 is driven by the outer shaft 49 and the inner or lower pressure roller is driven by the inner shaft 50, which is perpendicular to the angular truncated face 19 of the mandrel and extends through the mandrel at the complement of the helix angle relatively to the mandrel axis. As best shown in FIGS. 3, 5 and 6, this inner shaft 50 does not pass through the geometric center of the face 19 but passes through the face 19 eccentrically towards the top of the face, thus permitting insertion on the inner shaft of the roller 47, which is of the same or smaller diameter than the small diameter of the oval, angular face 19. It will be understood that the foregoing construction assures that transverse elements on the peripheries of the pressure rollers are disposed in horizontal planes substantially parallel to the longitudinal axis of the mandrel and thus to each other.

The shafts 49 and 50 may emanate from a common drive (not shown) and, as shown in FIG. 1, are supported relatively to the bed 11 by bearing blocks 51 and 52, the shaft 49 conveniently including a universal joint 54, as needed.

The rollers 46 and 47 must, of course, be resistant to heat, and so may be made of ceramic material, particularly where it is desired to obtain a good mashed lap weld; or the rollers may be made of steel, for example, coated with a suitable ceramic. Preferred ceramics for this purpose are alumina-ceramic, spark plug porcelain and steatite porcelains. Hard steel or other suitable hard metal such as an aluminum bronze known by the trademark "Ampco 24," may be used.

In order to guide the tube away from the mandrel as it is formed, there may be provided a plug 55, best shown in FIGS. 5, 6 and 7. The plug is recessed as at 56 on its inner surface so as not to interfere with the lower roller 47, and in effect, serves to extend the mandrel body portion 17, beyond the oval face 19, the inner face of the plug being angularly complementary with the face 19.

Provision is also made for relieving the roller pressure so as not to squeeze, or to lessen the squeeze on the metal edges as they come together at the weld point either by the action of the mill operator, or automatically in the event of failure of the welding power. An embodiment of this feature of the invention is illustrated in FIG. 1 in which is shown a mounting member 56 supporting an adjustable slide 57 and a hydraulic piston and cylinder assembly 59 for controlling the movement of a slide 60. The upper roller shaft 49 is supported adjacent the roller 46 by the adjustable slide 57, as shown. In practice, the rollers 46 and 47 are adjusted relatively to one another by regulation of a screw adjustment 61 and a micrometer stop 62 is set for the desired amount of pressure to be applied to the weld by the rollers. The hydraulic cylinder of the assembly 59 is of the double acting type and may receive fluid under pressure at either end thereof through the supply line 64, controlled by a directional valve 65 which is arranged to direct fluid from the supply line to one end or the other of the hydraulic cylinder as determined by the position of the solenoid 66, the armature of which is connected to the valve member by a link 67 for that purpose. When the pressure is applied to the solenoid 66, the hydraulic cylinder is conditioned to actuate the slide 60 to the position at which it is stopped by the pre-set micrometer set 62, thus applying the desired pressure to the roller 46 to obtain the desired weld. If the power is suddenly turned off, the solenoid 66 actuates the valve 65 wherefore the hydraulic pressure immediately lifts the hydraulic slide 60 thus permitting the strip to pass freely between the rollers.

A simpler form of this safety feature involves the substitution of pre-loaded springs for the hydraulic extending and retracting mechanism. The roller slide is adjusted, as by a screw adjustment to provide the required pressure and, upon a power failure, the springs will have sufficient flexibility to absorb the shock of the cold strip traveling through the squeeze rolls.

In setting up the apparatus of the present invention for operation, a dummy tube, or at least the first helical convolution of the tube of the desired diameter is formed by hand. This convolution is placed around the body portion 17 of the mandrel, the diameter of that portion of the mandrel being approximately that of the tube to be formed but slightly smaller so as to allow free rotation of the strip on the body portion. The cage is also placed around the tube and secured to the mounting block 10. The total diameter of the tube is determined by the inner diameter of the cage.

The trailing end of the dummy tube is then passed back through the strip guide 29 and the feed rolls and the mounting block is then supported on the machine bed 11 and adjusted until an angle is determined whereby the strip will rotate freely with no strain in the forming head to form a helically wound spiral.

After the correct helix angle has thus been determined the notch 20 is cut at that angle in the drum-like portion of the mandrel, the body portion 17 of the mandrel is truncated at the helix angle and the inner roller shaft opening is cut. The mandrel and cage are then manually fixed to the machine bed.

In actual practice this empirical method of setting up the mill has proven superior to the use of calculations and tubes of the desired diameter made on mills so set up have run through the mill with no difficulty. Theoretically, of course, the helix angle of the tube being formed may be calculated by using the formula for a helix angle for screw threads as set forth in "American Machinist's Handbook" by Colvin & Stanley, 7th ed., McGraw-Hill, 1940, as modified to produce the following formula:

$$\frac{\text{strip width} - \text{lap}}{D} = \tan \text{ helix angle}$$

Where $D =$ outer diameter

However, as stated hereinbefore, the empirical method set forth has proven superior to the calculated method of setting up the mill.

From the foregoing description, it will be seen that the present concept contributes an improved mill for helically winding a metal ribbon while welding together adjacent edges of the ribbon along a helix line, the mill making possible the continuous, rapid formation of a uniform superior welded tubing. It will also be seen that the various parts constituting the mill are able to handle an indefinite length of tubing and all have a relatively long life.

While the invention has been described in detail with respect to a preferred embodiment, it will be understood by those skilled in the art that various modifications may be made without departing from the spirit and scope of the invention and it is intended to cover all such changes and modifications in the appended claims.

I claim:

1. In welding apparatus of the class described, means for adavncing a metal strip from a supply thereof, a forming head for receiving said strip and helically winding the same into a tube, said forming head comprising stationary mandrel means axially disposed at the helix angle relatively to the line of advance of the strip, stationary means disposed around said mandrel means for guiding said strip around said mandrel means, means for heating an edge of said advancing strip and a trailing edge of said tube in advance of the point of contact of said edges for forming a weld along a line of juncture thereof, squeeze rollers acting on said edges as they are brought into contact at welding temperature for pressing the same together therebetween, and a cam member fixedly mounted on said mandrel means and having an edge portion guiding the trailing edge of said tube as it approaches the weld point for controlling the relative positions of said edges.

2. In welding apparatus of the class described, means for advancing a metal strip from a supply thereof, a forming head receiving said strip, said forming head comprising a stationary mandrel including a body portion axially disposed at the helix angle of the tube relatively to the line of advance of the strip and a stationary guide member substantially surrounding said body portion and formed with strip receiving means, said mandrel body portion and said guide member being slightly spaced apart whereby they cooperate to helically guide the advancing strip into tubular formation, means for heating a marginal region along an edge of said advancing strip and a similar region along the trailing edge of said tube in advance of the point of contact of said edges for forming a lap weld along a zone of juncture thereof, squeeze rollers rotatable about axes inclined at the complement of said helix angle relatively to the axis of said mandrel body portion and pressing said edges as they are brought together at the weld point, drive means for said squeeze rollers, and tube guide means connected to an end of said mandrel body portion and effectively extending the length thereof beyond the weld point in the direction of movement of the formed tube for guiding the welded tube away from said mandrel body portion.

3. In welding apparatus of the class described, means for advancing a metal strip from a supply thereof, a forming head for receiving said strip and helically winding the same into a tube, said forming head comprising a stationary mandrel including a body portion disposed at the helix angle of the tube relatively to the line of advance of the strip and a stationary guide member surrounding said body portion and formed with strip receiving means, means for heating to welding temperature an edge of said advancing strip and a trailing edge of said tube in advance of the point of contact of said edges, and cam means fixedly mounted on said body portion of said stationary mandrel and having a surface slidably engaging the trailing edge of the last tube convolution to guide the same towards said weld point, said cam means being adjustable longitudinally relatively to said mandrel body portion to control the disposition of the approaching edges relatively to one another.

4. In welding apparatus of the class described, means for advancing a metal strip from a supply thereof, a forming head for receiving said strip, and helically winding the same into a tube, said forming head comprising a stationary mandrel axially disposed at the tube helix angle relatively to the line of advance of the strip and means for guiding said strip around said mandrel, means for heating an edge of said advancing strip and a trailing edge of said tube in advance of the point of contact of said edges for forming a weld along the zone of juncture thereof, said mandrel providing an end in a plane parallel to the line of advance of said strip, a squeeze roller mounted within the last convolution of said tube for rotation adjacent said mandrel end about an axis perpendicular thereto, a second squeeze roller mounted exterior of said tube, said rollers pressing said edges together as they are brought into contact at the weld point and means connected to said end of said mandrel means and effectively extending the length thereof in the direction of movement of the formed tube and guiding the welded tube away from said mandrel, said last mentioned means being recessed to receive said squeeze roller adjacent the end of said mandrel.

5. In welding apparatus of the class described, means for advancing a metal strip from a supply thereof, a forming head for receiving said strip and helically winding the same into a tube, said forming head comprising stationary mandrel means axially disposed at the tube helix angle relatively to the line of advance of the strip and means for guiding said strip around said mandrel means, means for heating an edge of said advancing strip and a trailing edge of said tube in advance of the point of contact of said edges for forming a lap weld along the zone of juncture thereof, said mandrel means being truncated angularly at one end thereof to provide a face in a plane parallel to the line of advance of the strip, and pressing means including a roller supported adjacent the truncated face of said mandrel means, said pressing means pressing said edges together as they are brought into contact at welding temperature, said truncated face of said mandrel means enabling said roller to be positioned for rotation in a plane parallel to the line of advance of the strip.

6. Welding apparatus according to claim 5, wherein said truncated face of said mandrel means provides an oval face at said one end thereof, and the diameter of said roller is less than the minor axis of said oval face.

References Cited in the file of this patent

UNITED STATES PATENTS

| | | |
|---|---|---|
| 1,689,374 | Williams | Oct. 30, 1928 |
| 1,832,059 | Stresau | Nov. 17, 1931 |
| 1,923,284 | Taylor | Aug. 22, 1933 |
| 2,158,796 | Harrah | May 16, 1939 |
| 2,216,606 | Taylor | Oct. 1, 1940 |
| 2,406,246 | Ogden | Aug. 20, 1946 |
| 2,598,446 | Schneider | May 27, 1952 |
| 2,873,353 | Rudd | Feb. 10, 1959 |

FOREIGN PATENTS

| | | |
|---|---|---|
| 386,272 | Great Britain | Jan. 12, 1933 |